Patented Aug. 14, 1923.

1,464,990

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

MANUFACTURE OF SODIUM FLUORIDE.

No Drawing. Application filed March 1, 1922. Serial No. 540,803.

*To all whom it may concern:*

Be it known that I, HENRY HOWARD, a citizen of the United States, residing at Cleveland, in the county of Cuyahoga and State of Ohio, have invented certain new and useful Improvements in the Manufacture of Sodium Fluoride, of which the following is a specification.

This invention relates to a process primarily designed for the manufacture of sodium fluoride but also resulting in the production of the valuable by-products, artificial cryolite and ammonium chlorid.

The usual process of making sodium fluoride comprises neutralizing hydrofluoric acid with soda ash, sodium carbonate. This process is simple but since soda ash is comparatively expensive and no by-products are formed to off-set the high cost of the soda ash, the sodium fluoride produced is rather costly.

I have found that sodium fluoride can be prepared from sodium chlorid as a starting material instead of the more expensive soda ash. However, in order to obtain economical yields of sodium fluoride by reacting upon sodium chlorid with hydrofluoric acid it is necessary to neutralize the hydrochloric acid generated by the reaction in order that the reaction $NaCl + HF \rightarrow NaF$ may proceed to substantial completion.

My process, therefore, consists in treating sodium chlorid with hydrofluoric acid and in neutralizing the hydrochloric acid as it is generated. As a neutralizing agent I use ammonia, preferably in the form of ammonical gas liquor.

According to my process I introduce hydrofluoric acid gas into a solution of sodium chlorid and simultaneously feed into the solution either gaseous or aqua ammonia, preferably gas liquor, at a rate just sufficient to maintain the reaction mixture slightly acid until hydrofluoric acid chemically equivalent to the sodium chlorid in the solution has been absorbed, whereupon the supply of hydrofluoric acid is stopped and the reaction mixture is neutralized by further addition of ammonia. The solution of sodium chlorid and the solution of ammonia, in case aqua ammonia is employed, must be sufficiently dilute to avoid the precipitation of ammonium chlorid.

The process is carried out ordinarily at room temperature, say about 60° F. but the reaction mixture becomes considerably warmed due to the heat generated by the reaction. After the reaction is completed, as described, the reaction mixture is cooled to about 60° F. and filtered to separate the precipitate of sodium fluoride which is then washed and dried and is ready for use.

The wash waters are conveniently used for dissolving the next batch of sodium chlorid.

The filtrate contains sodium fluoride, usually from 3 to 6 per cent, and ammonium chlorid. This sodium fluoride may be separated and recovered and the ammonium chlorid simultaneously purified by precipitating the sodium fluoride in the form of artificial cryolite. For this purpose I add to the filtrate a solution of aluminum fluoride in quantity sufficient to combine with the sodium fluoride present to form the compound $Al_2F_6.6NaF$. The resulting precipitate of artificial cryolite is separated from the liquid by filtration, washed and dried and is available for use. There is a good market for this product, for instance in the enameling industry.

The filtrate separated from the artificial cryolite is a concentrated, substantially pure solution of ammonium chlorid from which ammonium chlorid ready for the market may be prepared by concentrating the solution and crystallizing the ammonium chlorid.

The purpose of treating the solution of sodium chlorid with hydrofluoric acid and ammonia simultaneously is to avoid substantial loss of either. Both ammonia and hydrofluoric acid are quite volatile, and if either is added alone followed by the addition of the other some of the reagent which is added first and is therefore in large excess when the addition of the other reagent is made, will be volatilized and lost. For instance, if the whole of the ammonia is added first, part of it will be volatilized by the heat generated when the hydrofluoric acid is added, and a further amount of ammonia will be carried away by the inert gases accompanying the hydrofluoric acid gas.

A similar loss of hydrofluoric and hydrochloric acid will occur if the solution of sodium chlorid is first treated with hydrofluoric acid and then with ammonia, also the precipitated salt may consist in part of the acid salt $NaHF_2$, which once formed is not easy to break up.

The particular advantages of my process are as follows:

The process works smoothly and may be carried out in inexpensive apparatus and involves comparatively small expense for heat, power and labor. The three products, sodium fluoride, artificial cryolite, and ammonium chlorid, are each produced in a comparatively pure state. The production of pure ammonium chlorid is a particularly advantageous feature of the process since the purification of this product results in the production of another valuable product, artificial cryolite. The starting materials for the process and particularly the sodium chlorid and the ammonia are inexpensive and due to this and the other economies of the process the products are inexpensive.

I claim:

1. Process of making sodium fluoride which comprises simultaneously adding hydrofluoric acid and ammonia to a solution of sodium chlorid.

2. Process of making sodium fluoride which comprises simultaneously adding hydrofluoric acid gas and aqua ammonia to a solution of sodium chlorid.

3. Process of making sodium fluoride which comprises passing a stream of hydrofluoric acid gas into a solution of sodium chlorid and simultaneously feeding ammoniacal gas liquor into the solution at a rate just sufficient to maintain the reaction mixture slightly acid.

4. Process of making sodium fluoride and ammonium chlorid which comprises continuously dissolving hydrofluoric acid gas in a solution of sodium chlorid, neutralizing hydrochloric acid as it is generated in the solution by addition of ammonia, and recovering sodium fluoride and ammonium chlorid from the reaction mixture.

5. Process of making sodium fluoride and ammonium chlorid and purifying the ammonium chlorid with the production of artificial cryolite which comprises, reacting upon sodium chlorid in aqueous solution with hydrofluoric acid, neutralizing hydrochloric acid as it is generated in the solution by reaction with ammoniacal gas liquor, separating solid sodium fluoride from the reaction mixture, adding aluminum fluoride to the resulting mother liquor, separating the artificial cryolite so formed from the reaction mixture, and recovering ammonium chlorid from the resulting separated liquid.

In testimony whereof I affix my signature.

HENRY HOWARD.